United States Patent
Pearson et al.

(10) Patent No.: US 11,620,292 B1
(45) Date of Patent: Apr. 4, 2023

(54) SYSTEMS AND METHODS FOR PRESERVING SELECTIONS FROM MULTIPLE SEARCH QUERIES

(71) Applicant: Johnson Controls Tyco IP Holdings LLP, Milwaukee, WI (US)

(72) Inventors: Robert Pearson, Dover, MA (US); Sanela Suljic, Nashua, NH (US); Angel Rosario, Hudson, NH (US); Homayara Akter, Sudbury, MA (US); Chandramohan Abinandan, Westford, MA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/499,390

(22) Filed: Oct. 12, 2021

(51) Int. Cl.
| G06F 9/451 | (2018.01) |
| G06F 16/28 | (2019.01) |
| G06F 16/248 | (2019.01) |
| G06F 16/2457 | (2019.01) |
| G06F 16/215 | (2019.01) |

(52) U.S. Cl.
CPC .......... *G06F 16/2457* (2019.01); *G06F 9/451* (2018.02); *G06F 16/215* (2019.01); *G06F 16/248* (2019.01); *G06F 16/287* (2019.01)

(58) Field of Classification Search
CPC .... G06F 16/2457; G06F 9/451; G06F 16/215; G06F 16/248; G06F 16/287
See application file for complete search history.

(56) References Cited

U.S. PATENT DOCUMENTS

| 10,719,845 B2* | 7/2020 | Nair ...................... H04L 63/102 |
| 2006/0080354 A1* | 4/2006 | Berger ..................... G06F 16/20 |
| 2008/0222565 A1 | 9/2008 | Taylor et al. |
| 2009/0307255 A1 | 12/2009 | Park et al. |
| 2013/0227480 A1* | 8/2013 | Kim ....................... G06F 3/0482 715/810 |
| 2013/0326393 A1* | 12/2013 | Namioka ............... G06F 3/0484 715/780 |
| 2014/0181085 A1 | 6/2014 | Gokhale et al. |
| 2014/0380155 A1* | 12/2014 | Kim ......................... G06F 3/016 715/702 |
| 2015/0095315 A1* | 4/2015 | DeCrescenzo ...... G06F 3/04883 707/722 |
| 2016/0117063 A1* | 4/2016 | Fuller .................... G06F 3/0482 715/739 |

(Continued)

OTHER PUBLICATIONS

International Search Report and Written Opinion for International Patent Application No. PCT/US2022/077600, dated Dec. 16, 2022 (15 pages).

*Primary Examiner* — Jorge A Casanova
(74) *Attorney, Agent, or Firm* — ArentFox Schiff LLP

(57) ABSTRACT

Disclosed herein are apparatuses and methods for preserving selections from multiple search queries. An implementation may comprise receiving multiple search queries from a user and storing user selections from each search query result in a temporary database. Contents of the temporary database may be generated for simultaneous display with search query results on a graphical user interface. A user may then select actions to perform in relation to the selections in the temporary database and the system may transmit commands to execute the actions.

20 Claims, 10 Drawing Sheets

(56) References Cited

U.S. PATENT DOCUMENTS

| | | | | |
|---|---|---|---|---|
| 2016/0124595 | A1* | 5/2016 | Kim | G06F 3/0483 |
| | | | | 715/769 |
| 2017/0063755 | A1* | 3/2017 | Pulfer | G06F 21/606 |
| 2019/0394149 | A1* | 12/2019 | McNeill | H04L 51/56 |
| 2020/0065397 | A1* | 2/2020 | Goenka | G06F 21/6209 |
| 2022/0269678 | A1* | 8/2022 | Li | G06F 16/248 |

* cited by examiner

500

Email Web Application/Client — □ ×

| | Search | | health | GO | | 🏷 🔧 ⚙ |
|---|---|---|---|---|---|---|
| | | | Subject | | From | Time |
| Inbox | ☐ | | How are you? | | aaa@abc.com | 1:00pm 11/11/20 |
| Sent | ☐ | | Dr Appointment Next Thursday | | bbb@abc.com | 3:14pm 11/12/20 |
| Trash | ☑ | | Pharmacy Prescription Available for Pic... | | | ...2/20 |
| Folder 1 | ☐ | | Get Well Soon | | | .../20 |
| Folder 2 | ☑ | | Immunization Forms | | | ...7/20 |
| | ☑ | | Insurance Confirmation: Welcome to th... | | | .../20 |
| | ☑ | | Insurance Card in the Mail | | | .../20 |

Selection 502

Window 504:

| | Name | Actions |
|---|---|---|
| × | Pharmacy Prescription Available for Pickup | ≡ |
| × | Immunization Forms | ≡ |
| × | Insurance Confirmation: Welcome to the Family! | ≡ |
| × | Insurance Card in the Mail | ≡ |

[ CLOSE ]

Fig. 5

SYSTEMS AND METHODS FOR PRESERVING SELECTIONS FROM MULTIPLE SEARCH QUERIES

TECHNICAL FIELD

The described aspects relate to search user interfaces (UIs).

BACKGROUND

Aspects of the present disclosure relate generally to search user interfaces (UIs), and more particularly, to preserving selections from multiple database search queries.

Sifting through search results can be a cumbersome task when a user is trying to track different results across different queries. Conventional search UIs generate a first set of results to a first query and wipe those results when a second query is made. If a user made selections in the first set of results, those selections are lost and the user needs to enter the first query again to go back. Using such UIs is inefficient in terms of time (e.g., users need to revisit older queries), access (e.g., no tracking exists for objects of interest), and resource usage (e.g., processing for redundant queries).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method for transmitting access control commands based on multiple database queries, including receiving, via a graphical user interface, a first query to view at least a portion of access control objects stored in a first database. The method further includes generating, for display on the graphical user interface, results of the first query comprising a first subset of the access control objects. Additionally, the method further includes receiving a selection of a second subset of access control objects in the first subset. Additionally, the method further includes receiving, via the graphical user interface, a second query to access at least a portion of access control objects stored in a second database. Additionally, the method further includes preserving the selection of the second subset, despite a second query being received, by storing the second subset in a temporary database. Additionally, the method further includes receiving a selection of a third subset of access control objects from results generated in response to the second query. Additionally, the method further includes storing the third subset in the temporary database. Additionally, the method further includes generating, for display on the graphical user interface, contents of the temporary database and a list of performable actions for each access control object stored in the temporary database. Additionally, the method further includes receiving a selection of at least one access control object in the temporary database and a performable action of the at least one access control object to execute. Additionally, the method further includes transmitting a command to the at least one access control object to execute the performable action.

Another example implementation includes an apparatus for transmitting access control commands based on multiple database queries, including a memory and a processor in communication with the memory. The processor is configured to receive, via a graphical user interface, a first query to view at least a portion of access control objects stored in a first database. The processor is further configured to generate, for display on the graphical user interface, results of the first query comprising a first subset of the access control objects. Additionally, the processor further configured to receive a selection of a second subset of access control objects in the first subset. Additionally, the processor further configured to receive, via the graphical user interface, a second query to access at least a portion of access control objects stored in a second database. Additionally, the processor further configured to preserve the selection of the second subset, despite a second query being received, by storing the second subset in a temporary database. Additionally, the processor further configured to receive a selection of a third subset of access control objects from results generated in response to the second query. Additionally, the processor further configured to store the third subset in the temporary database. Additionally, the processor further configured to generate, for display on the graphical user interface, contents of the temporary database and a list of performable actions for each access control object stored in the temporary database. Additionally, the processor further configured to receive a selection of at least one access control object in the temporary database and a performable action of the at least one access control object to execute. Additionally, the processor further configured to transmit a command to the at least one access control object to execute the performable action.

Another example implementation includes a computer-readable medium storing instructions for transmitting access control commands based on multiple database queries executable by a processor to receive, via a graphical user interface, a first query to view at least a portion of access control objects stored in a first database. The instructions are further executable to generate, for display on the graphical user interface, results of the first query comprising a first subset of the access control objects. Additionally, the instructions are further executable to receive a selection of a second subset of access control objects in the first subset. Additionally, the instructions are further executable to receive, via the graphical user interface, a second query to access at least a portion of access control objects stored in a second database. Additionally, the instructions are further executable to preserve the selection of the second subset, despite a second query being received, by storing the second subset in a temporary database. Additionally, the instructions are further executable to receive a selection of a third subset of access control objects from results generated in response to the second query. Additionally, the instructions are further executable to store the third subset in the temporary database. Additionally, the instructions are further executable to generate, for display on the graphical user interface, contents of the temporary database and a list of performable actions for each access control object stored in the temporary database. Additionally, the instructions are further executable to receive a selection of at least one access control object in the temporary database and a performable action of the at least one access control object to execute. Additionally, the instructions are further executable to transmit a command to the at least one access control object to execute the performable action.

Another example implementation includes a method for email retrieval based on multiple database queries, including receiving, via a graphical user interface, a first query to view at least a portion of emails stored in a mail system server. Additionally, the method further includes generating, for display on the graphical user interface, results of the first query comprising a first subset of the emails. Additionally, the method further includes receiving a selection of a second subset of emails in the first subset. Additionally, the method further includes receiving, via the graphical user interface, a second query to access at least another portion of the emails stored in the mail system server. Additionally, the method further includes preserving the selection of the second subset, despite a second query being received, by storing the second subset in a temporary database. Additionally, the method further includes receiving a selection of a third subset of emails from results generated in response to the second query. Additionally, the method further includes storing the third subset in the temporary database. Additionally, the method further includes generating, for display on the graphical user interface, contents of the temporary database and a list of performable actions for each email stored in the temporary database. Additionally, the method further includes receiving a selection of at least one email in the temporary database and a performable action of the at least one email to execute. Additionally, the method further includes executing the performable action on the at least one email.

Another example implementation includes an apparatus for email retrieval based on multiple database queries, including a memory and a processor in communication with the memory. The processor is configured to receive, via a graphical user interface, a first query to view at least a portion of emails stored in a mail system server. Additionally, the processor is further configured to generate, for display on the graphical user interface, results of the first query comprising a first subset of the emails. Additionally, the processor is further configured to receive a selection of a second subset of emails in the first subset. Additionally, the processor is further configured to receive, via the graphical user interface, a second query to access at least another portion of the emails stored in the mail system server. Additionally, the processor is further configured to preserve the selection of the second subset, despite a second query being received, by storing the second subset in a temporary database. Additionally, the processor is further configured to receive a selection of a third subset of emails from results generated in response to the second query. Additionally, the processor is further configured to store the third subset in the temporary database. Additionally, the processor is further configured to generate, for display on the graphical user interface, contents of the temporary database and a list of performable actions for each email stored in the temporary database. Additionally, the processor is further configured to receive a selection of at least one email in the temporary database and a performable action of the at least one email to execute. Additionally, the processor is further configured to execute the performable action on the at least one email.

Another example implementation includes a computer-readable medium storing instructions for email retrieval based on multiple database queries, executable by a processor to receive, via a graphical user interface, a first query to view at least a portion of emails stored in a mail system server. Additionally, the instructions are further executable to generate, for display on the graphical user interface, results of the first query comprising a first subset of the emails. Additionally, the instructions are further executable to receive a selection of a second subset of emails in the first subset. Additionally, the instructions are further executable to receive, via the graphical user interface, a second query to access at least another portion of the emails stored in the mail system server. Additionally, the instructions are further executable to preserve the selection of the second subset, despite a second query being received, by storing the second subset in a temporary database. Additionally, the instructions are further executable to receive a selection of a third subset of emails from results generated in response to the second query. Additionally, the instructions are further executable to store the third subset in the temporary database. Additionally, the instructions are further executable to generate, for display on the graphical user interface, contents of the temporary database and a list of performable actions for each email stored in the temporary database. Additionally, the instructions are further executable to receive a selection of at least one email in the temporary database and a performable action of the at least one email to execute. Additionally, the instructions are further executable to execute the performable action on the at least one email.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 5 is a diagram of a GUI displaying preserved email selections from a plurality of search queries in a temporary database, in accordance with exemplary aspects of the present disclosure.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure includes apparatuses and methods that preserve user selections across multiple search queries. Selections are stored in a temporary database whose contents are displayed on a graphical user interface (GUI). If a user makes a new search query, the selections they made from the results of a previous search query are not lost and can be viewed simultaneously with the results of the new search query.

Figure 1:
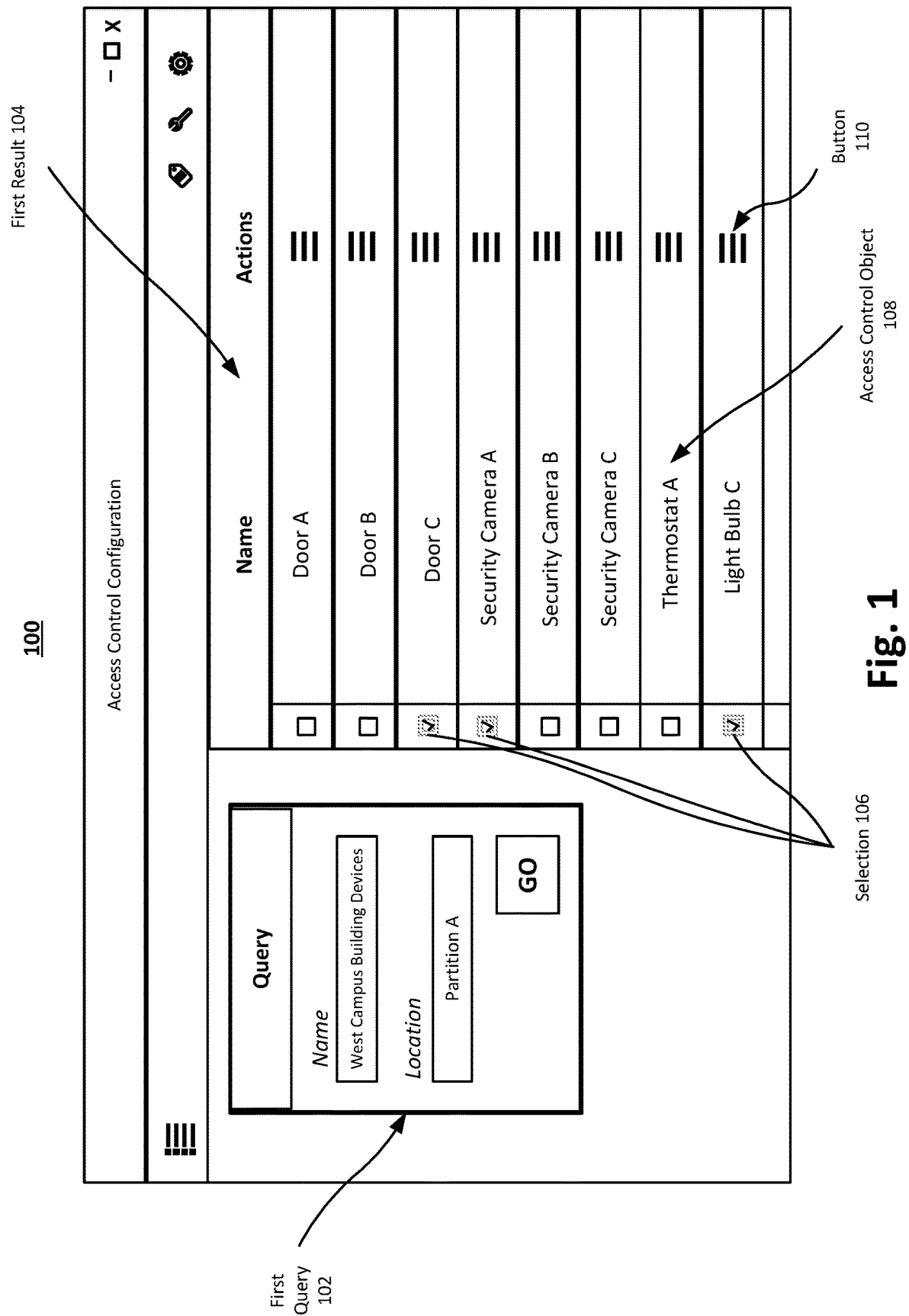
FIG. 1 is a diagram of a graphical user interface (GUI) through which a first search query is received, in accordance with exemplary aspects of the present disclosure.

FIG. 1 is a diagram of GUI 100 through which a first search query is received, in accordance with exemplary aspects of the present disclosure. GUI 100 may be generated on computing device 600 (see FIG. 6), which may be a computer, a laptop, a smartphone, a tablet, or any other device that can display GUI 100 and receive selections and queries (e.g., using a touchscreen interface, a mouse, a microphone, a camera, etc.).

In GUI 100, a first query 102 is entered as "west campus building devices" in "partition A." It should be noted that first query 102 may be provided using a physical input (e.g., typing), a verbal input, or a gesture. A partition may be a particular memory device accessible by the computer device 600, such as, but not limited to, a solid state drive that is connected to computing device 600. In some aspects, computing device 600 communicates with a different device (e.g., a remote server) where partition A exists.

In response to receiving first query 102, a database component (e.g., database component 615 described in FIG. 6) searches the database in partition A for access control objects associated with the term "west campus building devices" and generates first result 104 for display on GUI 100.

An access control object is an identifier in the GUI (e.g., an image, an icon, text, etc.) that represents a physical device in an environment. The physical device, such as a door, may have attributes and functionality that can be configured by corresponding performable actions listed on the GUI (described in FIG. 4). Database component 615 may be configured to communicate with the physical device over a network connection (e.g., the Internet, Bluetooth, etc.).

First result 104 includes one or more access control objects (e.g., access control object 108) such as identifiers of doors, security cameras, thermostats, light bulbs, or any other physical object that can be configured via action buttons (e.g., button 110) in GUI 100 (e.g., the three dash icon next to each result). A user may select a subset of the access control objects in first result 104. For example, in FIG. 1, user selection 106 includes door C, security camera A, and light bulb C.

Figure 2:
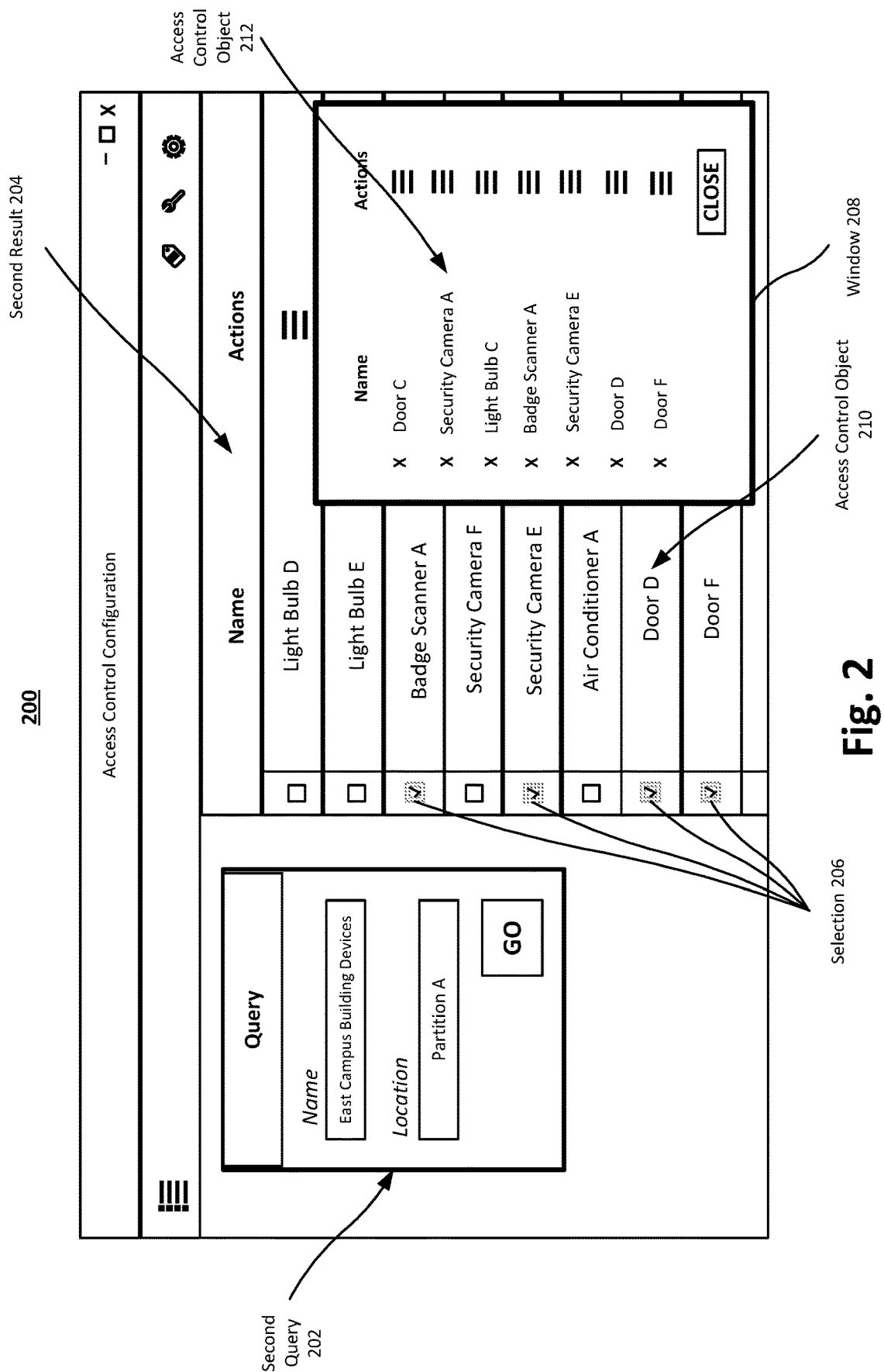
FIG. 2 is a diagram of a GUI through which selections preserved in a temporary database are received, in accordance with exemplary aspects of the present disclosure.

FIG. 2 is a diagram of GUI 200 through which selections preserved in a temporary database are received, in accordance with exemplary aspects of the present disclosure. GUI 200 is a subsequent instance of GUI 100. Suppose that the user wants to make another search query after first query 102. In a conventional search UI, selection 106 is lost once the new query is entered. However, the present disclosure describes preserving the selection. For example, database component 615 may receive second query 202 (e.g., "east campus building devices") and generate second result 204, which includes a different set of access control objects (e.g., access control object 210). Rather than forgetting selection 106, database component 615 stores selection 106 in a temporary database on computing device 600. Database component 615 may create the temporary database when a selection is made in a search result, and may delete the temporary database when all selections stored in the temporary database are removed from the temporary database.

In some aspects, database component 615 may generate contents of the temporary database for display in a new window/panel that hovers over the GUI. For example, the contents of temporary database are displayed in a secondary window 208 over the primary window of GUI 200. In other aspects, the contents may be displayed in another portion of the primary window.

The contents of the temporary database may be displayed simultaneously with second result 204 so that the user may refer to both second result 204 and the temporary database before making selection 206. When selection 206 is made, the selected access control objects are added to the temporary database by database component 615. For example, selection 206 includes badge scanner A, security camera E, and doors D and F. These access control objects (e.g., access control object 212) can also be seen in window 208.

Alongside displaying the contents of the temporary database, database component 615 may generate, for display, action buttons next to each access control object in window 208 displaying the contents of the temporary database.

Figure 3:
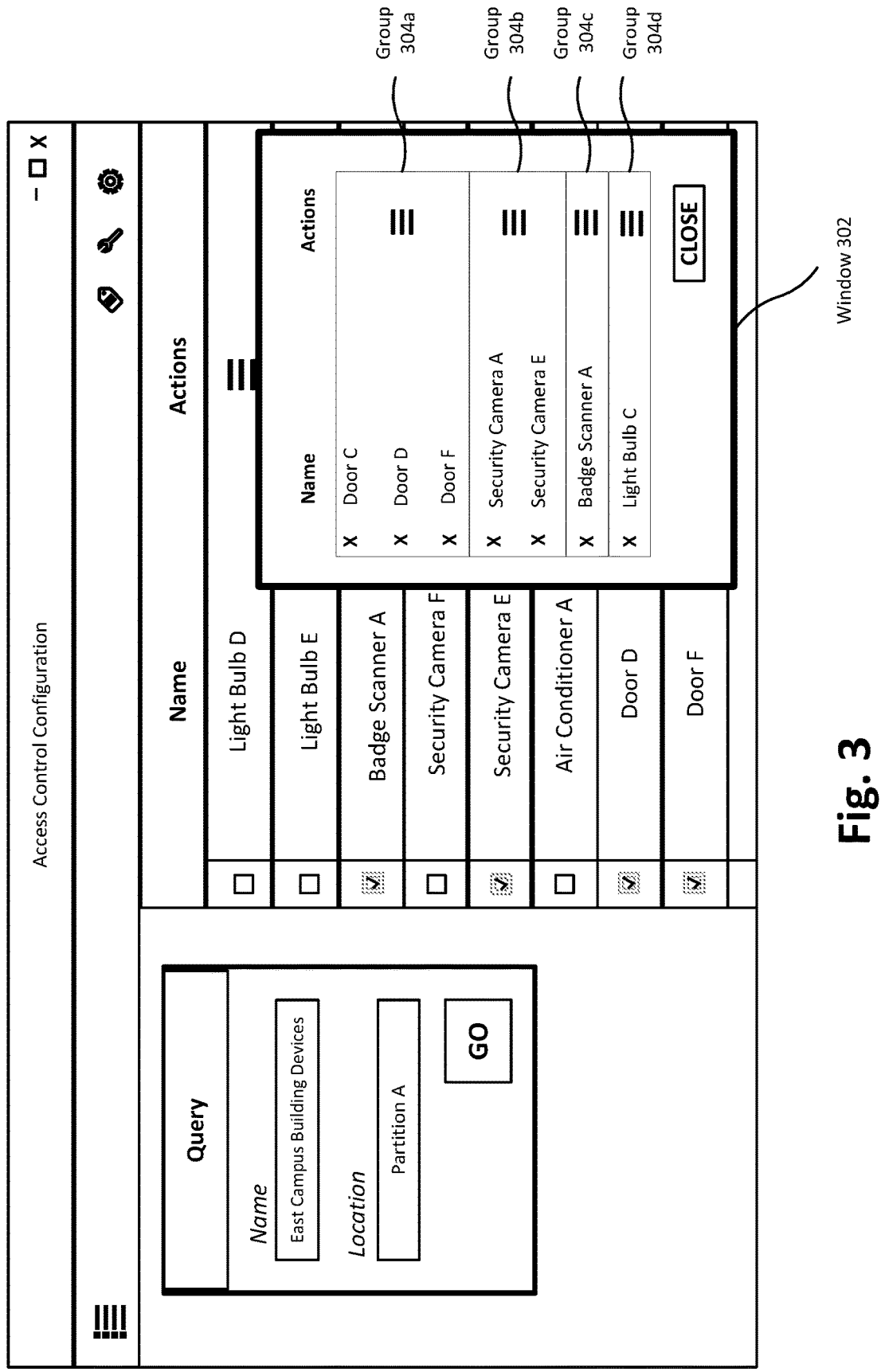
FIG. 3 is a diagram of a GUI through which selections preserved in a temporary database are grouped, in accordance with exemplary aspects of the present disclosure.

FIG. 3 is a diagram of GUI 300 through which selections preserved in a temporary database are grouped, in accordance with exemplary aspects of the present disclosure. GUI 300 may be a subsequent instance of GUI 200. One objective of the present disclosure is to improve the manner in which results from different queries are managed. Unlike a conventional search UI where results from different queries are manage separately (e.g., because the first set of results can get lost after the second query is made), in some aspects, database component 615 may group access control objects of the same type so that actions can be performed more efficiently.

A type of access control object is determined by database component 615 based on a predetermined class identifier provided by the physical device. For example, door C may be associated with the class "door." In general, each type of access control object has a unique set of performable actions. If a class identifier is not provided, database component 615 may group different access control objects with the same unique set of performable actions under the same class and give the class a generic name (e.g., "class A").

In the example of GUI 300, window 302 displays four groups and corresponding physical devices in each group: group 304a (e.g., Door C, Door D, and Door F), group 304b (e.g., Security Camera A, Security Camera E), group 304c (e.g., Badge Scanner A), and group 304d (e.g., Light Bulb C). All doors can be configured using the same set of actions and all have the same functionality. The same applies to all security cameras. It should be noted that some of the access control objects in the doors xxx group came from selection 106 and some came from selection 206.

In some aspects, database component 615 may place only one action button xxx next to each group of access control objects xxx to reduce the amount of redundant buttons on the GUI and to improve action execution. For example, rather than selecting each access control object individually from window 302 and selecting a corresponding action individually, a user may select one or more access control objects (e.g., door(s)) and select an action that should be performed for all selections.

Figure 4:
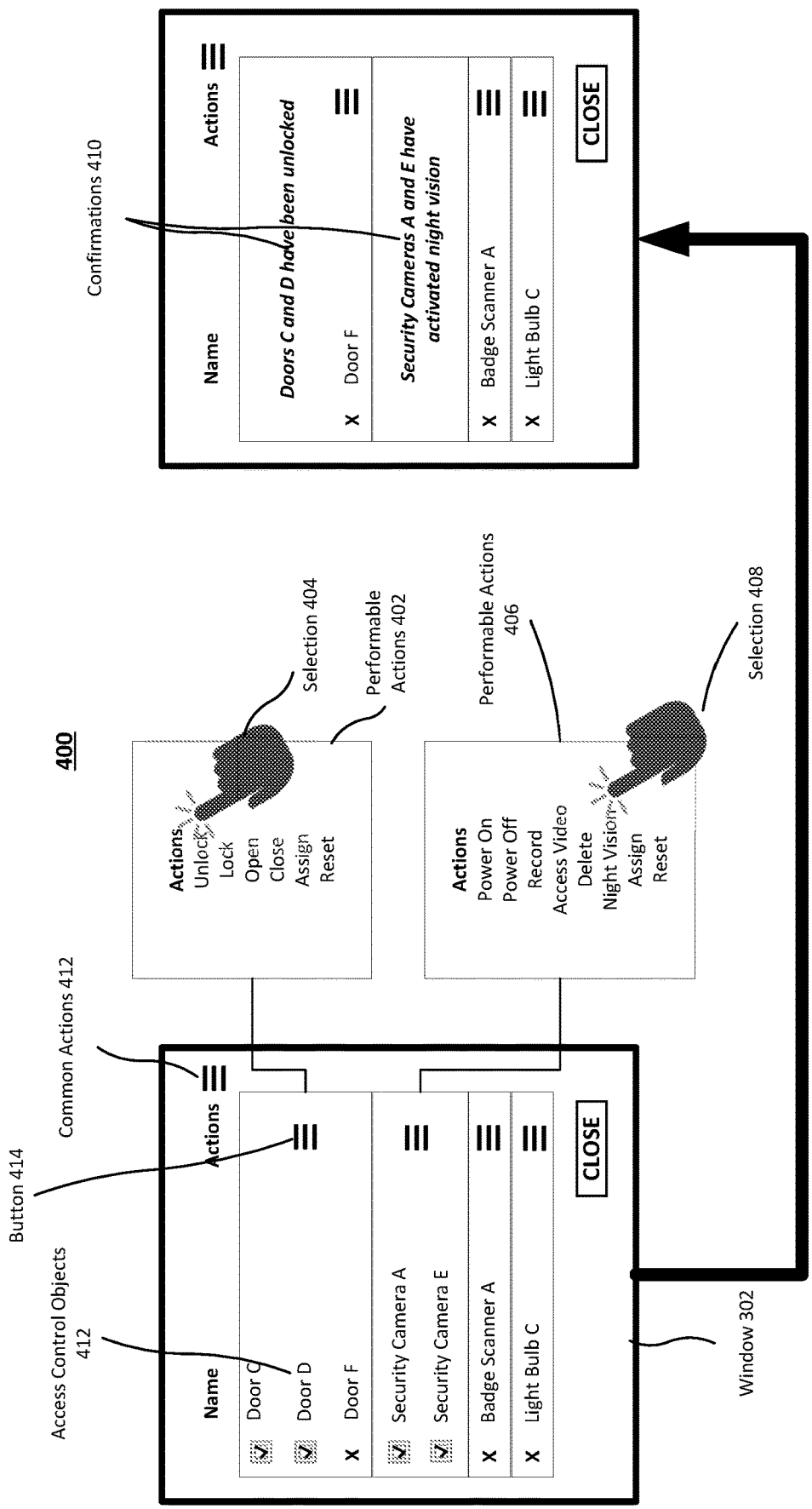
FIG. 4 is a diagram of action selections made in the temporary database, in accordance with exemplary aspects of the present disclosure.

FIG. 4 is diagram 400 of action selections made in the temporary database, in accordance with exemplary aspects of the present disclosure. Suppose that a user selects one of access control object 412 (e.g., door C and door D) from window 302 and selects action button 414. The available performable actions 402 may be generated as a pop-up window/panel on the GUI and may include actions "unlock," "lock," "open," "close," "assign," "reset." The user may select the "unlock" action as part of selection 404 and in response, database component 615 may transmit a command to door C and door D to unlock. For example, each access control object may have a microprocessor that can receive commands over a network (e.g., the Internet) and execute the commands. In this case, the microprocessor of a door may control its locking mechanism. A user may also select all of the security cameras in window 302 and select, as part of selection 408, an action to activate "night vision" from performable actions 406.

When the commands are executed by the respective access control objects, in some aspects, database component 615 may receive confirmation messages transmitted from the access control objects by the respective microprocessors. For example, database component 615 may receive confirmations from doors C and D that they have been unlocked and may receive confirmations from security cameras A and E that the night vision mode has been activated. In response to receiving these confirmations, database component 615 may generate, for display, confirmation messages 410 on the window displaying contents of the temporary database (e.g., window 302). In some aspects, confirmation messages 410 may be displayed in a separate window/panel than the window displaying contents of the temporary database. In other aspects, as shown in FIG. 4, confirmation messages 410 may be displayed in place of the selections made by the user. In yet some other aspects, the confirmation messages 410 may be displayed for a period of time (e.g., 30 seconds) before being removed from display. In this case, the selected items for which actions have been performed may be removed by database components 615 from the temporary database.

In some aspects, a user may select access control objects in different groups. For example, the user may select door C and security camera A. In this case, database component 615 may generate for display a common actions button (e.g., common actions 412) on the GUI (e.g., in window 302). When clicked, common actions 412 lists actions that are shared between access control objects in both groups (e.g., "assign," "reset").

FIG. 5 is a diagram of GUI 500 displaying preserved email selections from a plurality of search queries in a temporary database, in accordance with exemplary aspects of the present disclosure. Similar to how database component 615 functions for GUIs 100, 200, and 300, database component 1115 (described in FIG. 11) functions for GUI 500. A user may make a user query "health" in a web application or an email client. Database component 1115 of the web application or email client may search for and generate a plurality of emails corresponding to the query. The user may make selection 502 of a subset of the results, and database component 1115 adds the selection to a temporary database, whose contents may be generated on GUI 500 in window 504. A user can then make a subsequent query without losing track of the selections made.

Figure 6:
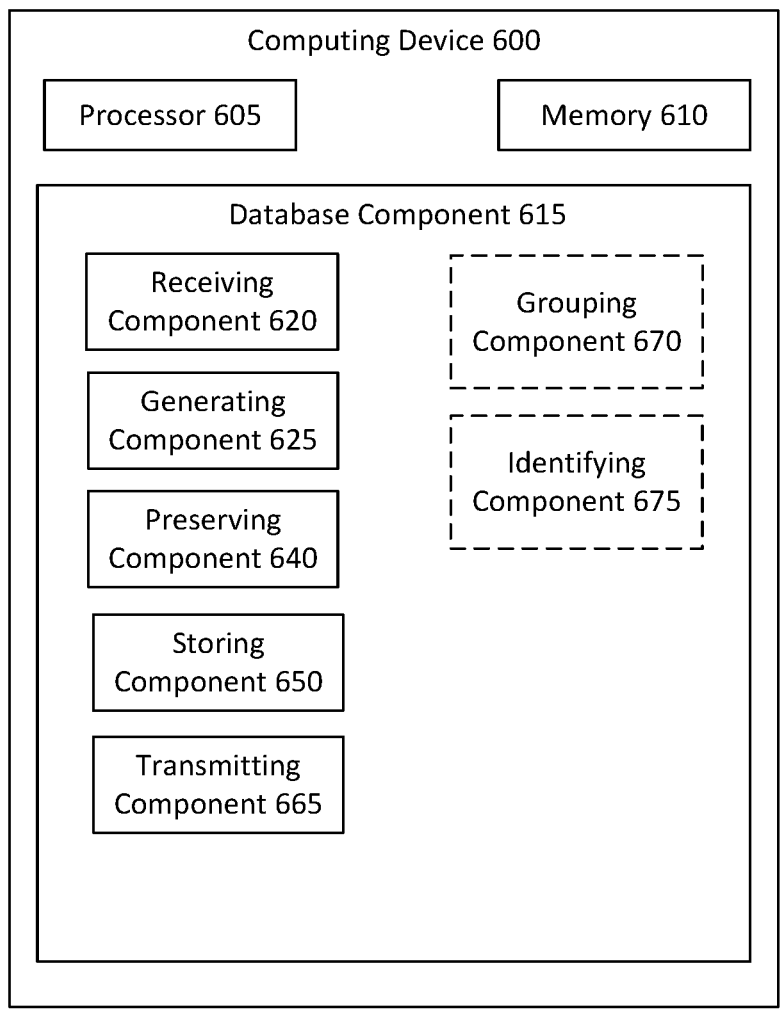
FIG. 6 is a block diagram of a computing device executing a database component, in accordance with exemplary aspects of the present disclosure.
Figure 7:
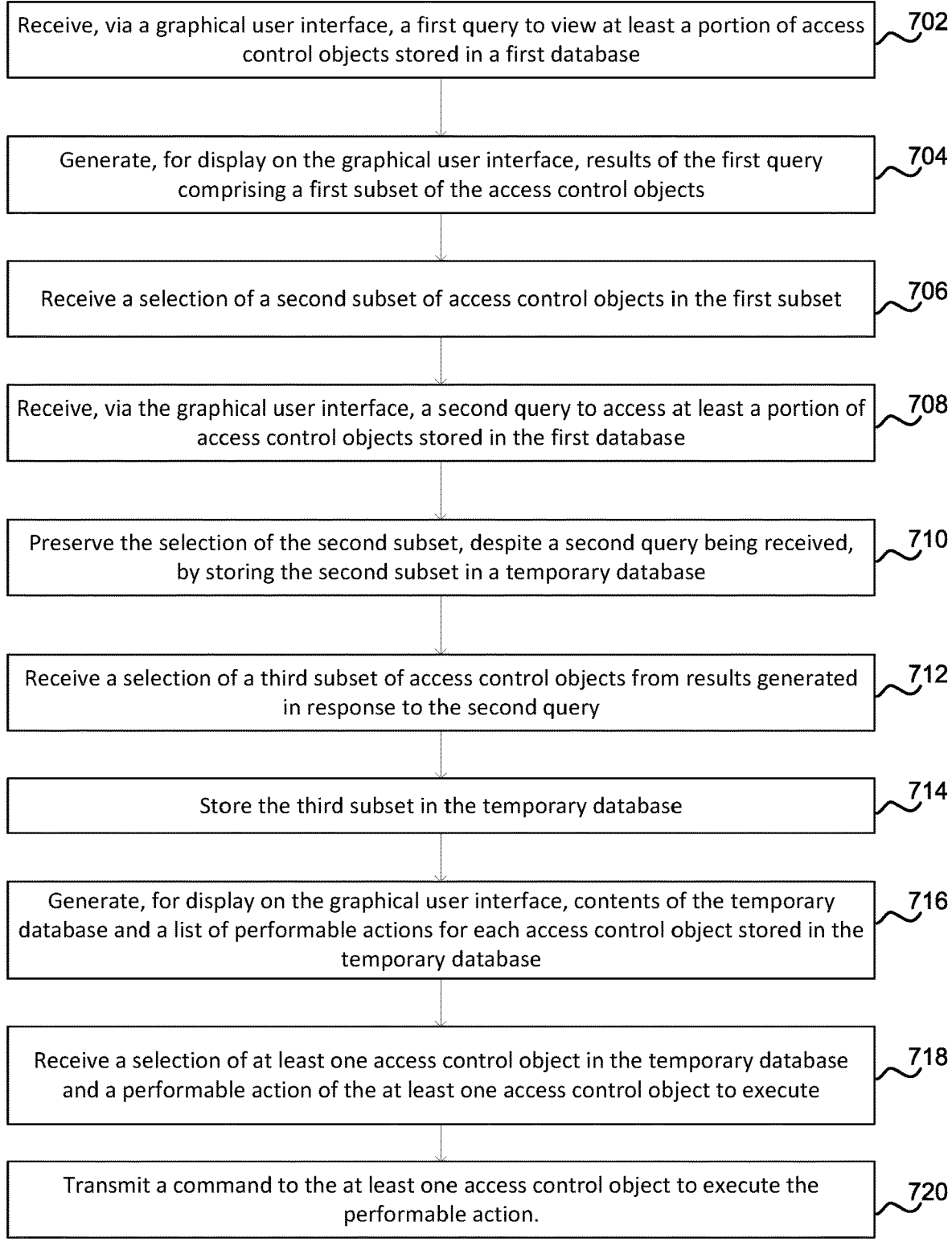
FIG. 7 is a flowchart illustrating a method of preserving selections from multiple search queries, in accordance with exemplary aspects of the present disclosure.

Referring to FIG. 6 and FIG. 7, in operation, computing device 600 may perform a method 700 for transmitting access control commands based on multiple database queries, such as via execution of database component 615 by processor 605 and/or memory 610.

FIG. 7 is a flowchart illustrating method 700 of preserving selections from multiple search queries, in accordance with exemplary aspects of the present disclosure.

At block 702, the method 700 includes receiving, via a graphical user interface, a first query to view at least a portion of access control objects stored in a first database. For example, in an aspect, computing device 600, processor 605, memory 610, database component 615, and/or receiving component 620 may be configured to or may comprise means for receiving, via GUI 100, first query 102 (e.g., "west campus building devices") to view at least a portion of access control objects stored in a first database (e.g., partition A).

At block 704, the method 700 includes generating, for display on the graphical user interface, results of the first query comprising a first subset of the access control objects. For example, in an aspect, computing device 600, processor 605, memory 610, database component 615, and/or generating component 625 may be configured to or may comprise means for generating, for display on GUI 100, results (e.g., first result 104) of first query 102 comprising a first subset of the access control objects (e.g., door A, door B, door C, etc.). In an aspect, generating the results of the first query on the graphical user interface further comprises generating, for display, a list of performable actions for each access control object in the first subset.

At block 706, the method 700 includes receiving a selection of a second subset of access control objects in the first subset. For example, in an aspect, computing device 600, processor 605, memory 610, database component 615, and/or receiving component 620 may be configured to or may comprise means for receiving selection 106 of a second subset of access control objects (e.g., door C, security camera A, light bulb C) in the first subset.

At block 708, the method 700 includes receiving, via the graphical user interface, a second query to access at least a portion of access control objects stored in a second database. For example, in an aspect, computing device 600, processor 605, memory 610, database component 615, and/or receiving component 620 may be configured to or may comprise means for receiving, via GUI 200 (same as GUI 100 but a subsequent instance), second query 202 to access at least a portion of access control objects stored in the first database. In some aspects, the second query may be for a different database on the same storage device as the first database. In some aspects, the different database may be stored on a different storage device. In an optional aspect, the first database is stored in a first partition of a storage device and the different database is stored in a second partition of the storage device.

At block 710, the method 700 includes preserving the selection of the second subset, despite a second query being received, by storing the second subset in a temporary database. For example, in an aspect, computing device 600, processor 605, memory 610, database component 615, and/ or preserving component 640 may be configured to or may comprise means for preserving the selection of the second subset, despite a second query being received, by storing the second subset in a temporary database (e.g., in memory 610 of computing device 600). In an optional aspect, storing the second subset of access control objects in the temporary database further comprises generating a copy of each respective access control object (e.g., the identifier) in the second subset in the database and storing the copy in the temporary database. This way, the identifier can be viewed in the temporary database and its original database.

At block 712, the method 700 includes receiving a selection of a third subset of access control objects from results generated in response to the second query. For example, in an aspect, computing device 600, processor 605, memory 610, database component 615, and/or receiving component 620 may be configured to or may comprise means for receiving selection 206 of a third subset of access control objects (e.g., badge scanner A, security camera E, door D, and door F) from results generated in response to the second query (e.g., second result 204).

At block 714, the method 700 includes storing the third subset in the temporary database. For example, in an aspect, computing device 600, processor 605, memory 610, database component 615, and/or storing component 650 may be configured to or may comprise means for storing the third subset in the temporary database.

At block 716, the method 700 includes generating, for display on the graphical user interface, contents of the temporary database and a list of performable actions for each access control object stored in the temporary database. For example, in an aspect, computing device 600, processor 605, memory 610, database component 615, and/or generating component 625 may be configured to or may comprise means for generating, for display on GUI 200, contents of the temporary database and a list of performable actions for each access control object stored in the temporary database. For example, generating component 625 may generate secondary window 208 comprising the contents of the temporary database and performable actions, or may generate directly on the primary window of GUI 200, the contents of the temporary database and performable actions.

At block 718, the method 700 includes receiving a selection of at least one access control object in the temporary database and a performable action of the at least one access control object to execute. For example, in an aspect, computing device 600, processor 605, memory 610, database component 615, and/or receiving component 620 may be configured to or may comprise means for receiving a selection of at least one access control object in the temporary database and a performable action of the at least one access control object to execute (e.g., selection of doors C and D in window 302 and selection 404 of "unlock" action in FIG. 4).

At block 720, the method 700 includes transmitting a command to the at least one access control object to execute the performable action. For example, in an aspect, computing device 600, processor 605, memory 610, database component 615, and/or transmitting component 665 may be configured to or may comprise means for transmitting a command to the at least one access control object to execute the performable action. For example, doors C and D may be instructed to unlock.

Figure 8:
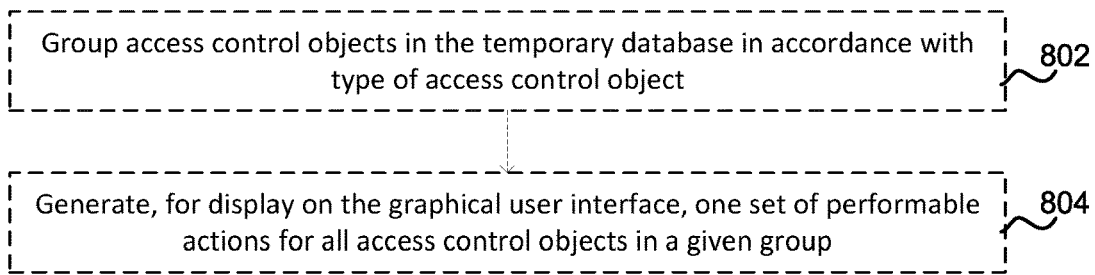
FIG. 8 is a flowchart illustrating a method of grouping access control objects, in accordance with exemplary aspects of the present disclosure.

FIG. 8 is a flowchart illustrating method 800 of grouping access control objects, in accordance with exemplary aspects of the present disclosure that may operate in combination with method 700.

In an optional aspect, referring to FIG. 8, at block 802 and in an aspect wherein each type of access control object has a unique set of performable actions, the method 800 may further include grouping access control objects in the temporary database in accordance with type of access control object. For example, in an aspect, computing device 600, processor 605, memory 610, database component 615, and/or grouping component 670 may be configured to or may comprise means for grouping access control objects in the temporary database in accordance with type of access control object. For example, grouping component 670 may identify all access control objects with the same performable actions and classify them as being a particular type of access control objects.

In this optional aspect, at block 804, the method 800 may further include generating, for display on the graphical user interface, one set of performable actions for all access control objects in a given group. For example, in an aspect, computing device 600, processor 605, memory 610, database component 615, and/or generating component 625 may be configured to or may comprise means for generating, for display on the graphical user interface, one set of performable actions for all access control objects in a given group. For example, as shown in FIG. 4, door C, door D, and door F are grouped together (marked by a rectangular boundary around the three access control objects that separates them from the other access control objects). There is only one action button for all three access control objects comprising a single set of performable actions 402.

Figure 9:
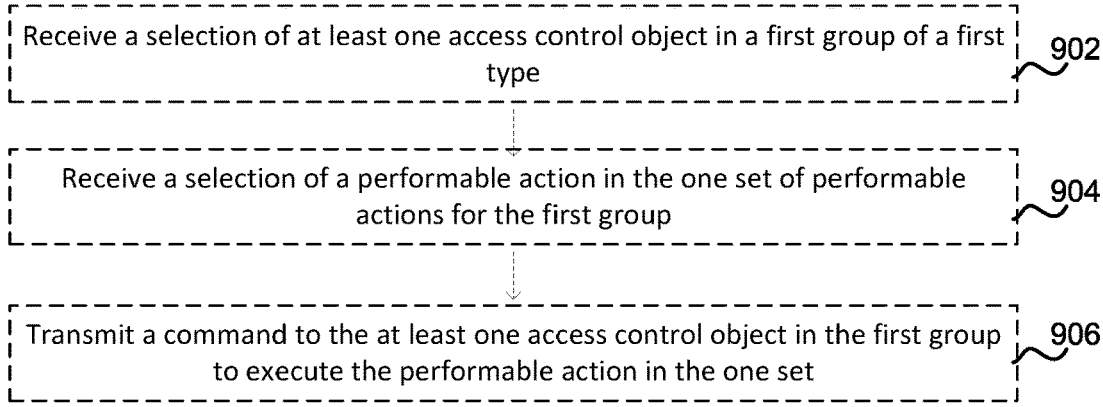
FIG. 9 is a flowchart illustrating a method of transmitting commands to multiple access control objects of a first group, in accordance with exemplary aspects of the present disclosure.

FIG. 9 is a flowchart illustrating method 900 of transmitting commands to multiple access control objects of a first group, in accordance with exemplary aspects of the present disclosure that may operate in combination with method 700 and/or 800.

In an optional aspect, referring to FIG. 9, at block 902, the method 900 may further include receiving a selection of at least one access control object in a first group of a first type. For example, in an aspect, computing device 600, processor 605, memory 610, database component 615, and/or receiving component 620 may be configured to or may comprise means for receiving a selection of at least one access control object in a first group of a first type. For example, in FIG. 4, door C and door D are selected in window 302.

In this optional aspect, at block 904, the method 900 may further include receiving a selection of a performable action in the one set of performable actions for the first group. For example, in an aspect, computing device 600, processor 605, memory 610, database component 615, and/or receiving component 620 may be configured to or may comprise means for receiving a selection of a performable action in the one set of performable actions for the first group. For example, selection 404 is received from performable actions 402.

In this optional aspect, at block 906, the method 900 may further include transmitting a command to the at least one access control object in the first group to execute the performable action in the one set. For example, in an aspect, computing device 600, processor 605, memory 610, database component 615, and/or transmitting component 665 may be configured to or may comprise means for transmitting a command to the at least one access control object in the first group to execute the performable action in the one set. For example, door C and door D are instructed to execute an unlock action. The transmission of the command(s)/instruction(s) may be over network(s) that connect computing device 600 to the physical device(s) represented by the access control object(s).

Figure 10:
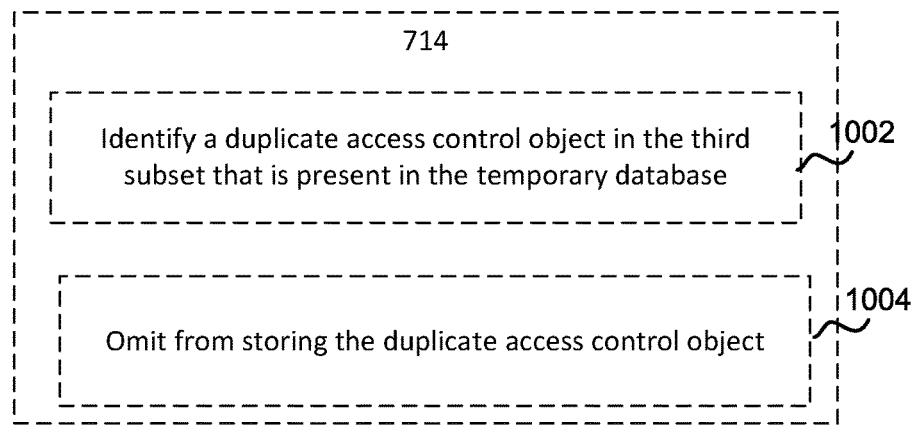
FIG. 10 is a flowchart illustrating a method of identifying duplicate selections, in accordance with exemplary aspects of the present disclosure.

FIG. 10 is a flowchart illustrating method 1000 of identifying duplicate selections, in accordance with exemplary aspects of the present disclosure that may operate in combination with method 700, 800, and/or 900.

In an optional aspect, referring to FIG. 10, at block 1002, the storing at block 714 of the third subset of access control objects in the temporary database further includes identifying a duplicate access control object in the third subset that is present in the temporary database. For example, in an aspect, computing device 600, processor 605, memory 610, database component 615, and/or identifying component 675 may be configured to or may comprise means for identifying a duplicate access control object in the third subset that is present in the temporary database. For example, if door C is present in temporary database and is selected again in a different query, identifying component 675 may determine that door C is already in the temporary database.

In this optional aspect, at block 1004, the method 1000 may further include omitting from storing the duplicate access control object in the temporary database. For example, in an aspect, computing device 600, processor 605, memory 610, database component 615, and/or storing component 650 may be configured to or may comprise means for omitting from storing the duplicate access control object in the temporary database (as it already exists and redundant copies will clutter the UI).

Figure 11:
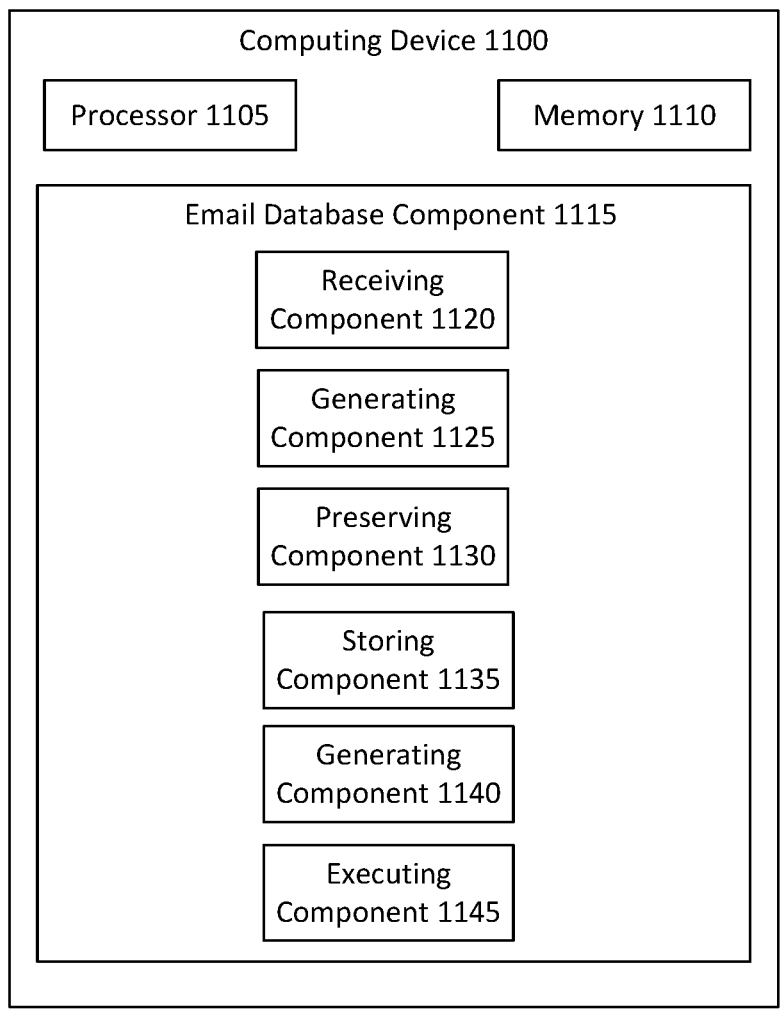
FIG. 11 is a block diagram of a computing device executing an email database component, in accordance with exemplary aspects of the present disclosure.
Figure 12:
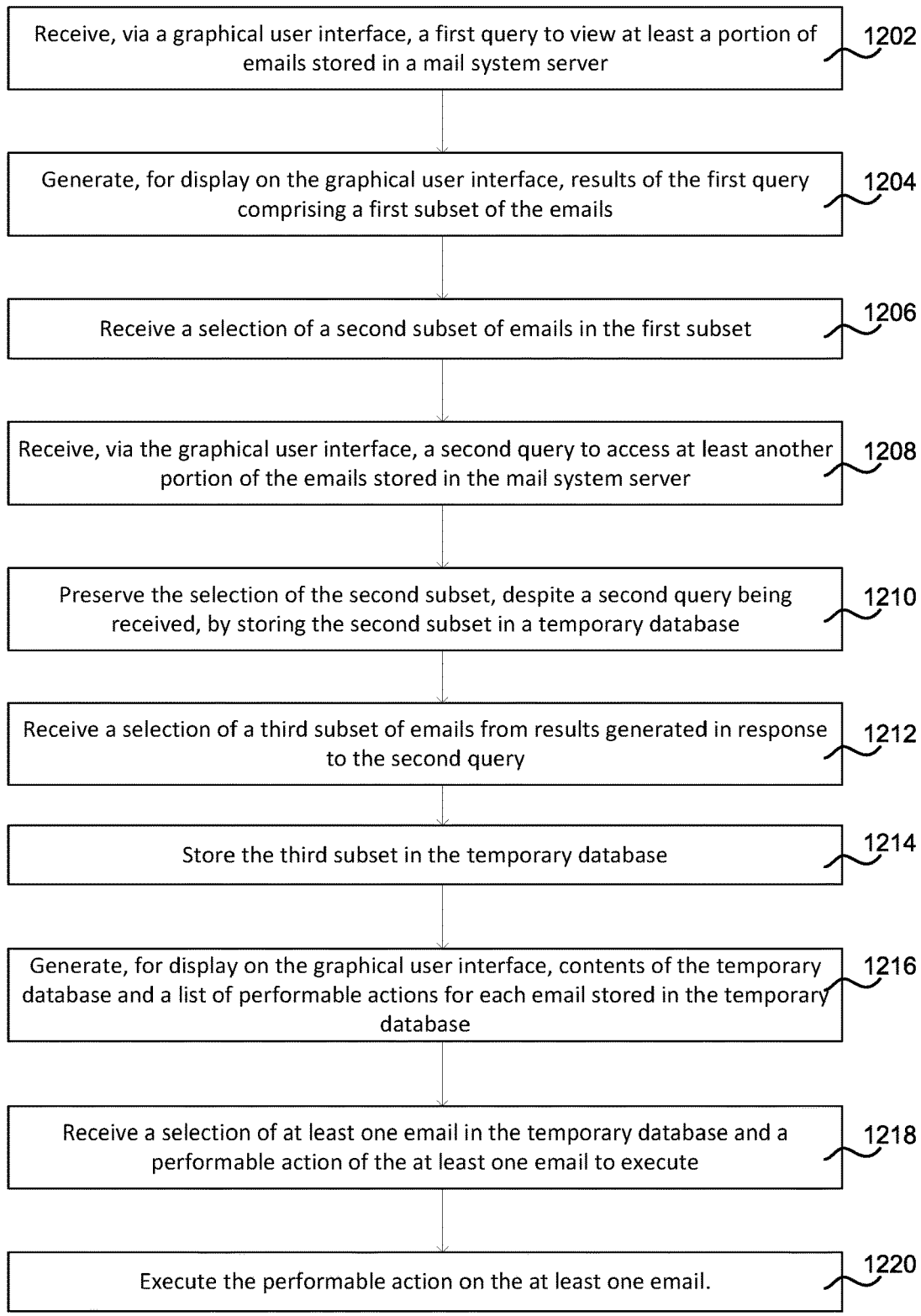
FIG. 12 is a flowchart illustrating a method of preserving email selections from multiple search queries, in accordance with exemplary aspects of the present disclosure.

Referring to FIG. 11 and FIG. 12, in operation of another aspect, computing device 1100 may perform a method 1200 for email retrieval based on multiple database queries, such as via execution of email database component 1115 by processor 1105 and/or memory 1110.

FIG. 12 is a flowchart illustrating method 1200 of preserving email selections from multiple search queries, in accordance with exemplary aspects of the present disclosure.

At block 1202, the method 1200 includes receiving, via a graphical user interface, a first query to view at least a portion of emails stored in a mail system server. For example, in an aspect, computing device 1100, processor 1105, memory 1110, email database component 1115, and/or receiving component 1120 may be configured to or may comprise means for receiving, via GUI 500, a first query (e.g., "health") to view at least a portion of emails stored in a mail system server.

In this aspect, at block 1204, the method 1200 includes generating, for display on the graphical user interface, results of the first query comprising a first subset of the emails. For example, in an aspect, computing device 1100, processor 1105, memory 1110, email database component 1115, and/or generating component 1125 may be configured to or may comprise means for generating, for display on GUI 500, results of the first query comprising a first subset of the emails (e.g., "how are you?," "Dr Appointment Next Thursday," . . . "Insurance Card in the Mail").

In this aspect, at block 1206, the method 1200 includes receiving a selection of a second subset of emails in the first subset. For example, in an aspect, computing device 1100, processor 1105, memory 1110, email database component 1115, and/or receiving component 1120 may be configured to or may comprise means for receiving a selection of a second subset of emails in the first subset (e.g., "Pharmacy Prescription Available for Pickup," "Immunization Forms," "Insurance Confirmation: Welcome to the Family!," "Insurance Card in the Mail").

In this aspect, at block 1208, the method 1200 includes receiving, via the graphical user interface, a second query to access at least another portion of the emails stored in the mail system server. For example, in an aspect, computing device 1100, processor 1105, memory 1110, email database component 1115, and/or receiving component 1120 may be configured to or may comprise means for receiving, via GUI 500, a second query to access at least another portion of the emails stored in the mail system server. For example, the user may enter a query such as "doctor" in the search bar of GUI 500.

In this aspect, at block 1210, the method 1200 includes preserving the selection of the second subset, despite a second query being received, by storing the second subset in a temporary database. For example, in an aspect, computing device 1100, processor 1105, memory 1110, email database component 1115, and/or preserving component 1130 may be configured to or may comprise means for preserving the selection of the second subset, despite a second query being received, by storing the second subset in a temporary database. For example, the emails in selection 502 may be stored in the temporary database so that they are not lost when the second query in received.

In this aspect, at block 1212, the method 1200 includes receiving a selection of a third subset of emails from results generated in response to the second query. For example, in an aspect, computing device 1100, processor 1105, memory 1110, email database component 1115, and/or receiving component 1120 may be configured to or may comprise means for receiving a selection of a third subset of emails from results generated in response to the second query. For example, the user may select more emails from the results associated with the "doctor" query.

In this optional aspect, at block 1214, the method 1200 includes storing the third subset in the temporary database. For example, in an aspect, computing device 1100, processor 1105, memory 1110, email database component 1115, and/or storing component 1135 may be configured to or may comprise means for storing the third subset in the temporary database. For example, the additional emails selected from the "doctor" query results may be stored in the temporary database.

In this optional aspect, at block 1216, the method 1200 includes generating, for display on the graphical user interface, contents of the temporary database and a list of performable actions for each email stored in the temporary database. For example, in an aspect, computing device 1100, processor 1105, memory 1110, email database component 1115, and/or generating component 1140 may be configured to or may comprise means for generating, for display on GUI 500, contents of the temporary database and a list of performable actions for each email stored in the temporary database. For example, generating component 1140 may generate window 504.

In this aspect, at block 1218, the method 1200 includes receiving a selection of at least one email in the temporary database and a performable action of the at least one email to execute. For example, in an aspect, computing device 1100, processor 1105, memory 1110, email database component 1115, and/or receiving component 1120 may be configured to or may comprise means for receiving a selection of at least one email in the temporary database and a performable action of the at least one email to execute. For example, the user may select the email "Immunization Forms," and may select an associated action such as marking the email as important, deleting the email, moving the email to a different folder, etc.

In this optional aspect, at block 1220, the method 1200 includes executing the performable action on the at least one email. For example, in an aspect, computing device 1100, processor 1105, memory 1110, email database component 1115, and/or executing component 1145 may be configured to or may comprise means for executing the performable action on the at least one email. For example, if the user selected an action to mark the email as important (e.g., flag the email), executing component 1145 may mark the email as important.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for transmitting access control commands based on multiple database queries, comprising:
   receiving, via a graphical user interface, a first query to view at least a portion of access control objects stored in a first database;
   generating, for display on the graphical user interface, results of the first query comprising a first subset of the access control objects;
   receiving a selection of a second subset of access control objects in the first subset;
   receiving, via the graphical user interface, a second query to access at least a portion of access control objects stored in a second database;
   preserving the selection of the second subset, despite a second query being received, by storing the second subset in a temporary database;
   receiving a selection of a third subset of access control objects from results generated in response to the second query;
   storing the third subset in the temporary database;
   generating, for display on the graphical user interface, contents of the temporary database and a list of performable actions for each access control object stored in the temporary database;
   receiving a selection of at least one access control object in the temporary database and a performable action of the at least one access control object to execute; and
   transmitting a command to the at least one access control object to execute the performable action.

2. The method of claim 1, wherein an access control object is an identifier of a physical device in an environment, wherein the physical device includes attributes and functionality that can be configured by corresponding performable actions listed in the graphical user interface.

3. The method of claim 1, wherein each type of access control object has a unique set of performable actions, further comprising:
   grouping access control objects in the temporary database in accordance with type of access control object; and
   generating, for display on the graphical user interface, one set of performable actions for all access control objects in a given group.

4. The method of claim 3, further comprising:
   receiving a selection of at least one access control object in a first group of a first type;
   receiving a selection of a performable action in the one set of performable actions for the first group; and
   transmitting a command to the at least one access control object in the first group to execute the performable action in the one set.

5. The method of claim 1, wherein the first database is stored in a first partition of a storage device and the second database is stored in a second partition of the storage device.

6. The method of claim 1, wherein storing the second subset of access control objects in the temporary database further comprises generating a copy of each respective access control object in the second subset in the database and storing the copy in the temporary database.

7. The method of claim 1, wherein storing the third subset of access control objects in the temporary database further comprises:
   identifying a duplicate access control object in the third subset that is present in the temporary database; and
   omitting from storing the duplicate access control object.

8. The method of claim 1, wherein generating the results of the first query on the graphical user interface further comprises generating, for display, a list of performable actions for each access control object in the first subset.

9. An apparatus for transmitting access control commands based on multiple database queries, comprising:
   a memory; and
   a processor in communication with the memory and configured to:
      receive, via a graphical user interface, a first query to view at least a portion of access control objects stored in a first database;
      generate, for display on the graphical user interface, results of the first query comprising a first subset of the access control objects;
      receive a selection of a second subset of access control objects in the first subset;
      receive, via the graphical user interface, a second query to access at least a portion of access control objects stored in a second database;
      preserve the selection of the second subset, despite a second query being received, by storing the second subset in a temporary database;
      receive a selection of a third subset of access control objects from results generated in response to the second query;
      store the third subset in the temporary database;
      generate, for display on the graphical user interface, contents of the temporary database and a list of performable actions for each access control object stored in the temporary database;
      receive a selection of at least one access control object in the temporary database and a performable action of the at least one access control object to execute; and
      transmit a command to the at least one access control object to execute the performable action.

10. The apparatus of claim 9, wherein an access control object is an identifier of a physical device in an environment, wherein the physical device includes attributes and functionality that can be configured by corresponding performable actions listed in the graphical user interface.

11. The apparatus of claim 9, wherein each type of access control object has a unique set of performable actions, wherein the processor is further configured to:
   group access control objects in the temporary database in accordance with type of access control object; and
   generate, for display on the graphical user interface, one set of performable actions for all access control objects in a given group.

12. The apparatus of claim 11, wherein the processor is further configured to:
receive a selection of at least one access control object in a first group of a first type;
receive a selection of a performable action in the one set of performable actions for the first group; and
transmit a command to the at least one access control object in the first group to execute the performable action in the one set.

13. The apparatus of claim 9, wherein the first database is stored in a first partition of a storage device and the second database is stored in a second partition of the storage device.

14. The apparatus of claim 9, wherein to store the second subset of access control objects in the temporary database the processor is further configured to generate a copy of each respective access control object in the second subset in the database and to store the copy in the temporary database.

15. The apparatus of claim 9, wherein to store the third subset of access control objects in the temporary database the processor is further configured to:
identify a duplicate access control object in the third subset that is present in the temporary database; and
omit from storing the duplicate access control object.

16. The apparatus of claim 9, wherein to generate the results of the first query on the graphical user interface the processor is further configured to generate, for display, a list of performable actions for each access control object in the first subset.

17. A non-transitory computer-readable medium storing instructions, for transmitting access control commands based on multiple database queries, executable by a processor to:
receive, via a graphical user interface, a first query to view at least a portion of access control objects stored in a first database;
generate, for display on the graphical user interface, results of the first query comprising a first subset of the access control objects;
receive a selection of a second subset of access control objects in the first subset;
receive, via the graphical user interface, a second query to access at least a portion of access control objects stored in a second database;
preserve the selection of the second subset, despite a second query being received, by storing the second subset in a temporary database;
receive a selection of a third subset of access control objects from results generated in response to the second query;
store the third subset in the temporary database;
generate, for display on the graphical user interface, contents of the temporary database and a list of performable actions for each access control object stored in the temporary database;
receive a selection of at least one access control object in the temporary database and a performable action of the at least one access control object to execute; and
transmit a command to the at least one access control object to execute the performable action.

18. A method for email retrieval based on multiple database queries, comprising:
receiving, via a graphical user interface, a first query to view at least a portion of emails stored in a mail system server;
generating, for display on the graphical user interface, results of the first query comprising a first subset of the emails;
receiving a selection of a second subset of emails in the first subset;
receiving, via the graphical user interface, a second query to access at least another portion of the emails stored in the mail system server;
preserving the selection of the second subset, despite a second query being received, by storing the second subset in a temporary database;
receiving a selection of a third subset of emails from results generated in response to the second query;
storing the third subset in the temporary database;
generating, for display on the graphical user interface, contents of the temporary database and a list of performable actions for each email stored in the temporary database;
receiving a selection of at least one email in the temporary database and a performable action of the at least one email to execute; and
executing the performable action on the at least one email.

19. An apparatus for email retrieval based on multiple database queries, comprising:
a memory; and
a processor in communication with the memory and configured to:
receive, via a graphical user interface, a first query to view at least a portion of emails stored in a mail system server;
generate, for display on the graphical user interface, results of the first query comprising a first subset of the emails;
receive a selection of a second subset of emails in the first subset;
receive, via the graphical user interface, a second query to access at least another portion of the emails stored in the mail system server;
preserve the selection of the second subset, despite a second query being received, by storing the second subset in a temporary database;
receive a selection of a third subset of emails from results generated in response to the second query;
store the third subset in the temporary database;
generate, for display on the graphical user interface, contents of the temporary database and a list of performable actions for each email stored in the temporary database;
receive a selection of at least one email in the temporary database and a performable action of the at least one email to execute; and
execute the performable action on the at least one email.

20. A non-transitory computer-readable medium storing instructions, for email retrieval based on multiple database queries, executable by a processor to:
receive, via a graphical user interface, a first query to view at least a portion of emails stored in a mail system server;
generate, for display on the graphical user interface, results of the first query comprising a first subset of the emails;
receive a selection of a second subset of emails in the first subset;
receive, via the graphical user interface, a second query to access at least another portion of the emails stored in the mail system server;
preserve the selection of the second subset, despite a second query being received, by storing the second subset in a temporary database;

receive a selection of a third subset of emails from results generated in response to the second query;

store the third subset in the temporary database;

generate, for display on the graphical user interface, contents of the temporary database and a list of performable actions for each email stored in the temporary database;

receive a selection of at least one email in the temporary database and a performable action of the at least one email to execute; and execute the performable action on the at least one email.

\* \* \* \* \*